US012214472B2

(12) United States Patent
Emerick

(10) Patent No.: US 12,214,472 B2
(45) **Date of Patent: *Feb. 4, 2025**

(54) SELF-ADJUSTING DEEP WELL SOCKET

(71) Applicant: Trevor W. Emerick, Butler, PA (US)

(72) Inventor: Trevor W. Emerick, Butler, PA (US)

( * ) Notice: Subject to any disclaimer, the term of this patent is extended or adjusted under 35 U.S.C. 154(b) by 335 days.

This patent is subject to a terminal disclaimer.

(21) Appl. No.: 17/663,890

(22) Filed: May 18, 2022

(65) Prior Publication Data

US 2022/0274231 A1 Sep. 1, 2022

Related U.S. Application Data

(63) Continuation-in-part of application No. 15/890,678, filed on Feb. 7, 2018, now abandoned, and a continuation-in-part of application No. 16/739,018, filed on Jan. 9, 2020, now Pat. No. 11,389,935.

(60) Provisional application No. 62/790,873, filed on Jan. 10, 2019, provisional application No. 62/457,589, filed on Feb. 10, 2017.

(51) Int. Cl.
*B25B 13/44* (2006.01)
*B25B 13/06* (2006.01)

(52) U.S. Cl.
CPC ............ *B25B 13/44* (2013.01); *B25B 13/065* (2013.01)

(58) Field of Classification Search
CPC ....... B25B 13/44; B25B 13/065; B25B 13/10; B25B 13/06
USPC ........................................................ 81/121.1
See application file for complete search history.

(56) References Cited

U.S. PATENT DOCUMENTS

| | | | | |
|---|---|---|---|---|
| 5,337,634 A * | 8/1994 | Carnesi | ............. B23B 31/16162 81/128 |
| 7,707,916 B2 * | 5/2010 | Pirseyedi | ................ B25B 13/44 279/64 |
| 2014/0053693 A1 * | 2/2014 | Womack | ................. B25B 13/18 81/128 |
| 2021/0367375 A1 * | 11/2021 | Anderson | .............. B25B 13/28 |

* cited by examiner

*Primary Examiner* — Hadi Shakeri
(74) *Attorney, Agent, or Firm* — Karen Tang-Wai Sutton

(57) ABSTRACT

A self-adjusting-size socket formed as a pair of coaxial tubes in rotatable relationship to one another, the innermost tube having a limited directional distance and independently rotational relationship with the outer tube by rotating along a mated set of threaded structures on immediately adjacent sides of the coaxial pair of tubes. The inner tube is a deep well chamber having a tool receiving end and a fastener receiving end, with an annular array of independently pivotable fingers arranged about an internal perimeter of the inner tube at the fastener receiving end. Rotation of the inner tube pushes a lowermost portion of the inner tube against the fingers, pushing them into the deep well chamber and around an irregularly shaped bolt or nut style fastener, gripping the fastener and allowing a user to remove or reinstall the fastener. The fingers self-adjust around the fastener.

19 Claims, 11 Drawing Sheets

SELF-ADJUSTING DEEP WELL SOCKET

CROSS REFERENCE TO RELATED APPLICATIONS

This application is a continuation-in-part to and claims priority from U.S. application Ser. No. 16/739,018 filed 9 Jan. 2020, which itself claimed priority from U.S. provisional application Ser. No. 62/790,837 filed 10 Jan. 2019, and from U.S. application Ser. No. 15/890,678 filed 7 Feb. 2018, which itself claimed priority from U.S. provisional application Ser. No. 62/457,589 filed 10 Feb. 2017, all of which are hereby incorporated by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of hand tools for fastening and unfastening bolts and nuts, and specifically to a self-adjusting socket used with a conventional socket wrench used to remove bolt and/or nut fasteners whose original hexagonal head and/or body is damaged or otherwise irregularly shaped and not removable using conventional prior art hand tools.

Background Art

Bolts and their corresponding mating nuts are common fasteners used in a variety of applications. These useful fasteners are typically formed with a hexagonal-shaped head, in the case of a bolt, or a hexagonal-shaped body with a threaded central hole, in the case of a nut, fastened and unfastened using wrenches. For a classic crescent wrench, or adjustable wrench, the ability of the wrench to securely fasten to the nut or bolt head is heavily dependent on the fastener having flat, parallel opposed surfaces against which the pair of wrench jaws can apply strong pressure in order to grip the fastener and turn it. The hexagonal-shaped head or body of the fastener increases the number of useful flat gripping surfaces.

Specialized socket wrenches that lock into cylindrical sockets formed with a hexagonal central bore are another standard wrench design that is particularly useful because the hexagonal shape of the fastener allows maximum torque and grip when used with the socket and socket wrench. A typical socket wrench set comes with many different socket sizes, each socket sized to fit over a standard bolt or nut size, with minimal play in the fit, and can be used in tight spaces where the ratcheting motion of the socket wrench minimizes the clearance required as compared to a standard wrench that can only at most grip two sides of the fastener. The socket itself allows the user to grip the fastener more stably. Sockets are selected to match the size of the fastener to be fastened or unfastened, positioned over the fastener, and the wrench is inserted into the wrench end of the socket and turned accordingly.

Unfortunately, the hexagonal-shaped nuts and bolt heads often suffer corrosion and other physical damage particularly when exposed to the elements, and removal using standard socket wrenches and sockets is challenging because the socket cannot tightly grip any of the sides of the damaged nut or bolt when irregularly shaped and smaller than the correct sized socket. The socket will turn without gripping the fastener, further damaging the hexagonal shape and potentially damaging the interior of the socket. Currently, sockets are not size or shape adjustable either, so a damaged nut or bolt head is often too small for the originally sized socket, but too large for the next smaller sized socket. The irregular shape of the fastener also often means that conventional wrenches are difficult to use to loosen these damaged fasteners, again because even a conventional wrench must be able to firmly grip two sides of the fastener, and it cannot do so easily if any of the sides are irregularly shaped or rounded because of limited gripping contact between fastener and wrench.

Another common problem using socket wrench sets is that a fastened bolt or nut is often so tightly fastened that the socket placed over the bolt or nut tends to ride upwards and damage the hexagonal sides of the fastener when attempting to remove it, creating an irregular shape or further damaging the fastener so that it is difficult to grasp using conventional hand tools. Currently, sockets are simply metal cylinders with hexagonal shaped cores that provide no other gripping other than relying on the shape of the socket being fractionally larger than the fastener so that all sides of the fastener are engaged by all sides of the socket, which allows a socket to be slide easily over a fastener but does nothing to otherwise secure the socket to the fastener.

Yet another common issue occurs when the damaged fastener is a nut threaded tightly onto a long bolt, and the bolt shank protrudes from the nut. A socket from a socket set must be long enough to accommodate the length of the shank when placed over it, and often especially when the nut is located in a tight spot, only a socket and socket wrench can remove it. Currently, when faced with this situation, often the only solution is to cut off the bolt shank with a saw, and/or drill out the bolt. In certain cases, the fastener cannot be removed without ultimately damaging the fastened parts. This is a common problem with plumbing fixtures, where toilet bolts notoriously corrode and become difficult or impossible to remove because of a lack of clearance space for a drill, and with lawn mowers, where interior fasteners inside the cutting deck are so badly corroded and damaged that the only option for removal is by being drilled out. The hexagonal-shaped fastener is thus optimally and easily fastened using a socket and socket wrench, and irritatingly unfastened using an assortment of drills, saws, hammers, spray lubricants, etc.

What is needed is a new socket that can effectively and securely grab deformed or otherwise irregular shaped fasteners as well as undamaged hexagonal-shaped fasteners to allow easy removal by conventional socket wrenches.

What is also needed is a new socket with a durable, mechanical threaded tightening mechanism using prior art socket and other wrenches to allow the removal of damaged or otherwise irregularly shaped fasteners.

DISCLOSURE OF INVENTION

The invention is a self-adjusting deep well socket having an external case body and a coaxial case insert, the coaxial body and insert threadably and rotatably mating such that the case insert rotates inside the case body along the mated threads. The case insert is further comprised of a tool receiver end sized and shaped to receive a drive square of a socket wrench, an opposed fastener receiver end sized and shaped to receive a threaded fastener, such as an approximately hexagonal shaped bolt head, and a deep well chamber extending from the tool receiver end to the opposed fastener receiving end. At the fastener receiving end, a plurality of independently pivoting fingers in an annular array are positioned inside the case insert. The plurality of independently pivoting fingers can move inwards into the deep well chamber and also out of the deep well chamber and into a finger channel formed by a gap existing between the exterior wall of the case insert and the interior wall of the case body. Rotating the case insert downwards, by inserting the drive square of the prior art socket wrench, causes a lowermost tip of the case insert to push against the plurality of fingers, pushing them out of the finger chamber and into the deep well chamber. When an irregularly shaped fastener is positioned inside the deep well chamber, each finger of the plurality of fingers pivots independently of each other finger against the fastener's sides, with some fingers moving relatively further into the deep well chamber as compared to other fingers in a same array to accommodate the irregularly shaped fastener. As the case insert is turned and moved further down into the finger chamber, the plurality of fingers tighten around the fastener until they can no longer be moved into the deep well chamber. At this point, the fastener can be removed (unfastened) or reapplied (refastened), as the case may be.

In yet another aspect of the invention, a wrench grip is provided on an exterior of the case body having at least one pair of opposed, flat, spaced apart parallel sides allowing a wrench to be positioned on the wrench grip. When a fastener is to be removed, the deep well chamber is positioned over the fastener, the drive square of the socket wrench is positioned into the tool receiver, and a crescent wrench is positioned on the wrench grip. The socket wrench is turned in a counterclockwise direction to tighten the fingers around the fastener and continues to turn the socket wrench to remove the fastener. To remove the socket from the fastener itself, the socket wrench and the crescent wrench are simultaneously turned in opposite directions to loosen the fingers from around the fastener. The fastener can then be discarded and a new undamaged fastener used, or optionally can be reapplied using a reverse thread self-adjusting socket.

In yet another aspect of the invention, the self-adjusting socket is a universal socket where the diameter of the deep well chamber, the fingers, and the finger chamber are such that the socket can replace the gripping capability of two or more prior art standard socket sizes. Hence a prior art socket set having four sockets sized ¼ inch, ⅜ inch, inch and ¾ inch can be replaced by a new set having just 2 sockets, a first socket covering fasteners ranging from ¼ inch to ⅜ inches in diameter and a second socket covering fasteners ranging from ½ inch to ¾ inches and so on.

In still yet another aspect of the invention, the mating threads of the self-adjusting socket can be a left handed thread or a right handed thread without loss of functionality.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1A:
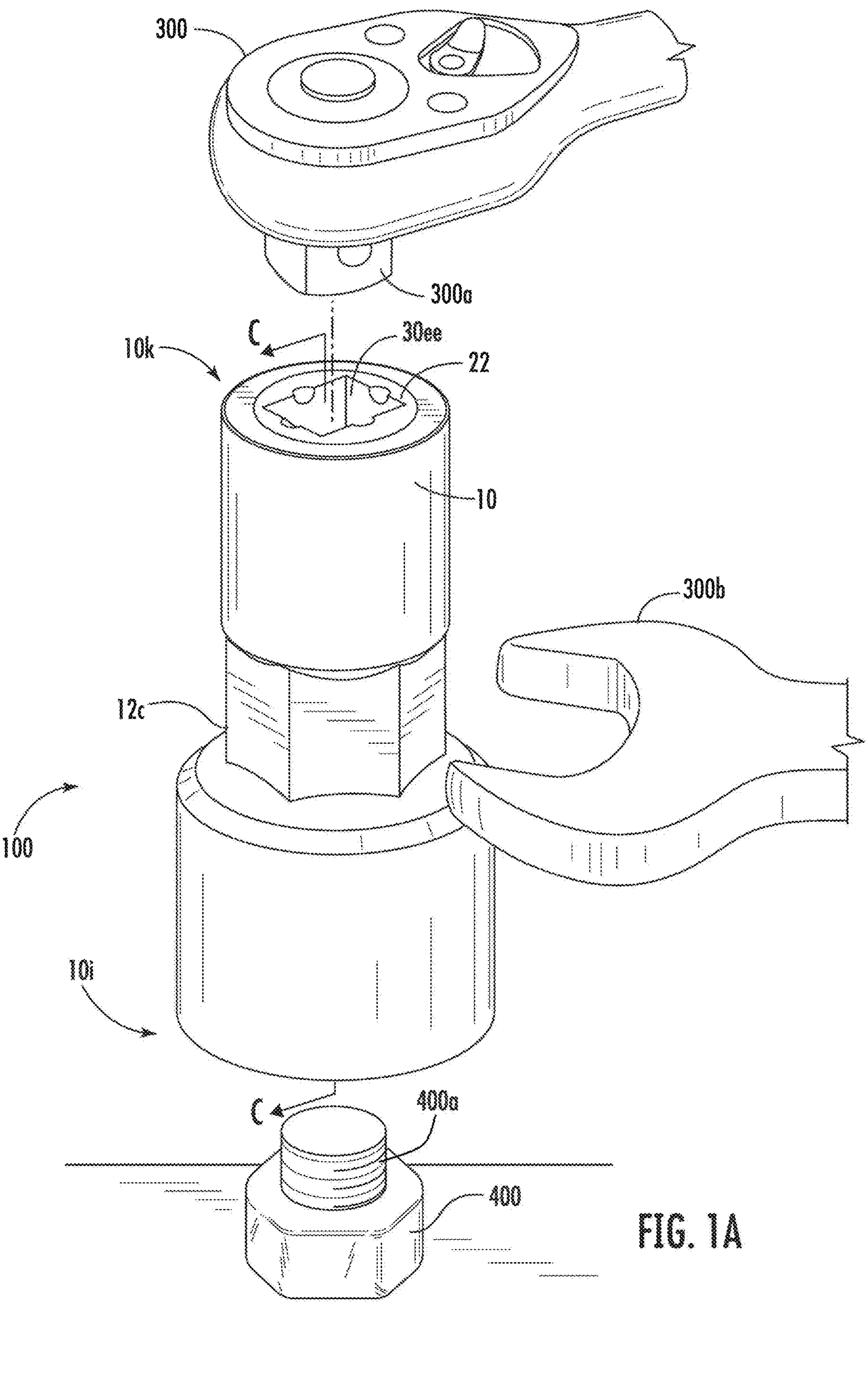
FIG. 1A is a perspective view of a self-adjusting deep well socket according to the invention, shown in a partially exploded view with a prior art fastener, prior art socket wrench and prior art crescent wrench.

The following is a list of reference labels used in the drawings to label components of different embodiments of the invention, and the names of the indicated components:

100 self-adjusting deep well socket or socket case body
10*c* main body cavity or deep well chamber
10*e* finger
10*eg* gripping side
10*ec* channel side
10*ed* spring
10*ef* spring plate
10*i* fastener end of case
10*k* tool end or wrench end of case
12*c* wrench or tool grip
14*a* finger channel
14*b* case body mating threads
22 case insert
22*a* case insert mating threads
22*c* upper ring
22*d* arm
22*e* pin
22*ek* hole or finger hole
22*f* tip of case insert
22*h* annular plate
22*i* finger support
22*j* finger bay
30*e* top opening
30*ee* tool receiver (socket drive square receiver)
300 prior art socket wrench
300*a* drive square of prior art socket wrench
300*b* crescent wrench grip or wrench grip
400 fastener
400*a* threaded fastener receiver

DETAILED DESCRIPTION

A self-adjusting deep well socket or socket 100 according to the invention is described in FIGS. 1A-6. Turning to FIG. 1A, the socket 100 is shown with a prior art socket wrench 300, a prior art crescent wrench 300*b*, and a prior art fastener 400, the fastener depicted as a hexagonal nut threaded onto a threaded portion or threaded fastener receiver 400*a* of a rod or a thread of a bolt. The prior art tools and fastener are included to illustrate how the socket 100 is used and are not part of the invention. The term fastener in this disclosure refers to a part of a fastener, here the bolt head and/or nut, that is gripped by the prior art wrench or other tool and turned to install or remove the fastener. Fastener thus refers to only that part that is actively gripped when installing or removing a bolt or nut and does not refer to a shank or the thread of the bolt, for instance. The term deep well refers to a type of socket that is long relative to its width and has an interior cavity with a length designed to allow the socket to accommodate the thread and/or the shank of the bolt, as shown in FIG. 1A, inside the cavity. Deep well thus does not define a particular length or size other than to describe the socket as being able to accommodate relatively long threads or shanks, spanning a couple of inches to several feet or more in some applications.

Turning now to the Figures, the socket 100 has three main parts: a case body 10, a case insert 22, and a finger support 22*i*.

Figure 1B:
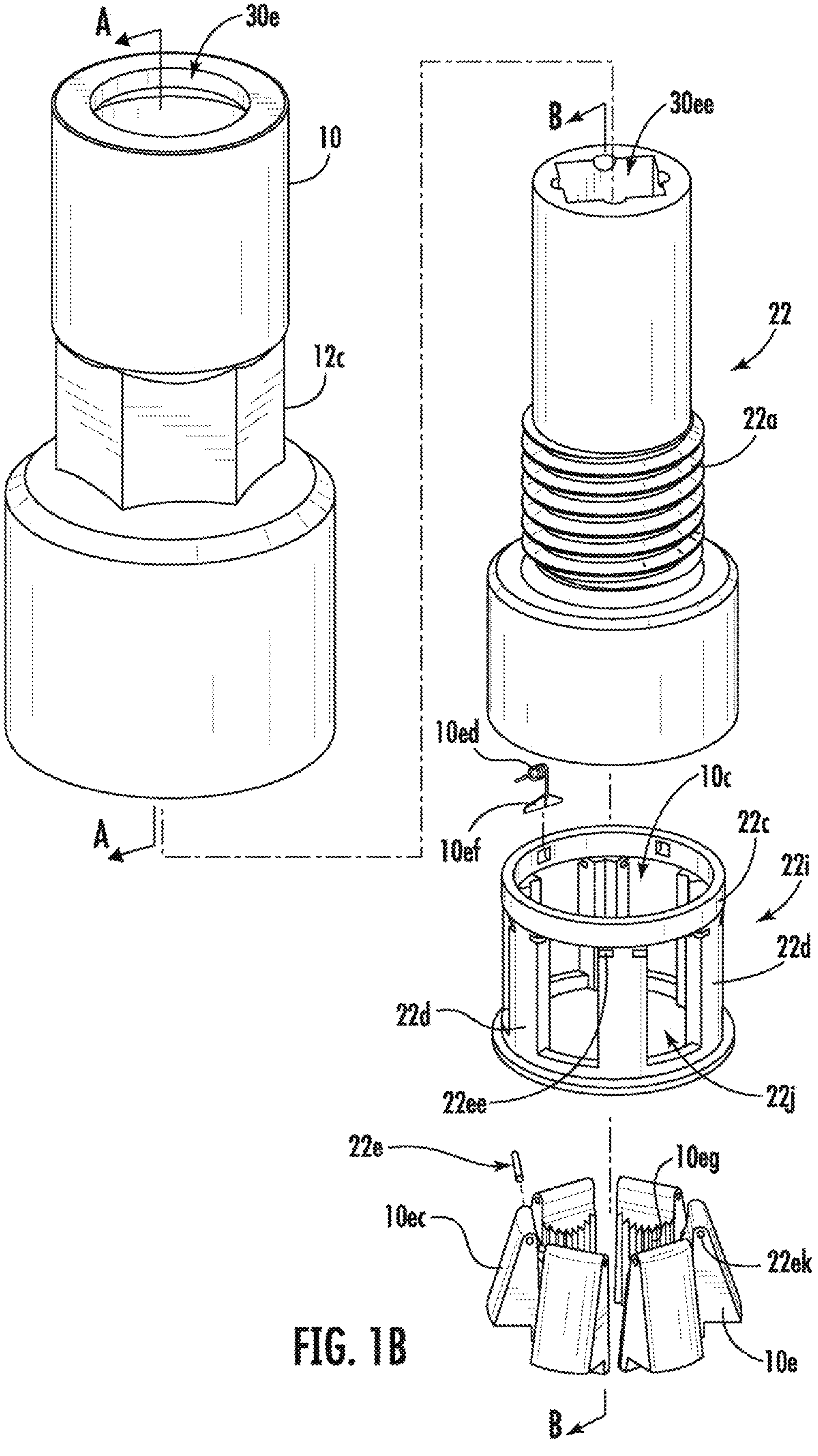
FIG. 1B is an exploded perspective view of a case body, a case insert, a finger support, and a plurality of fingers of the self-adjusting deep well socket.
Figure 2:
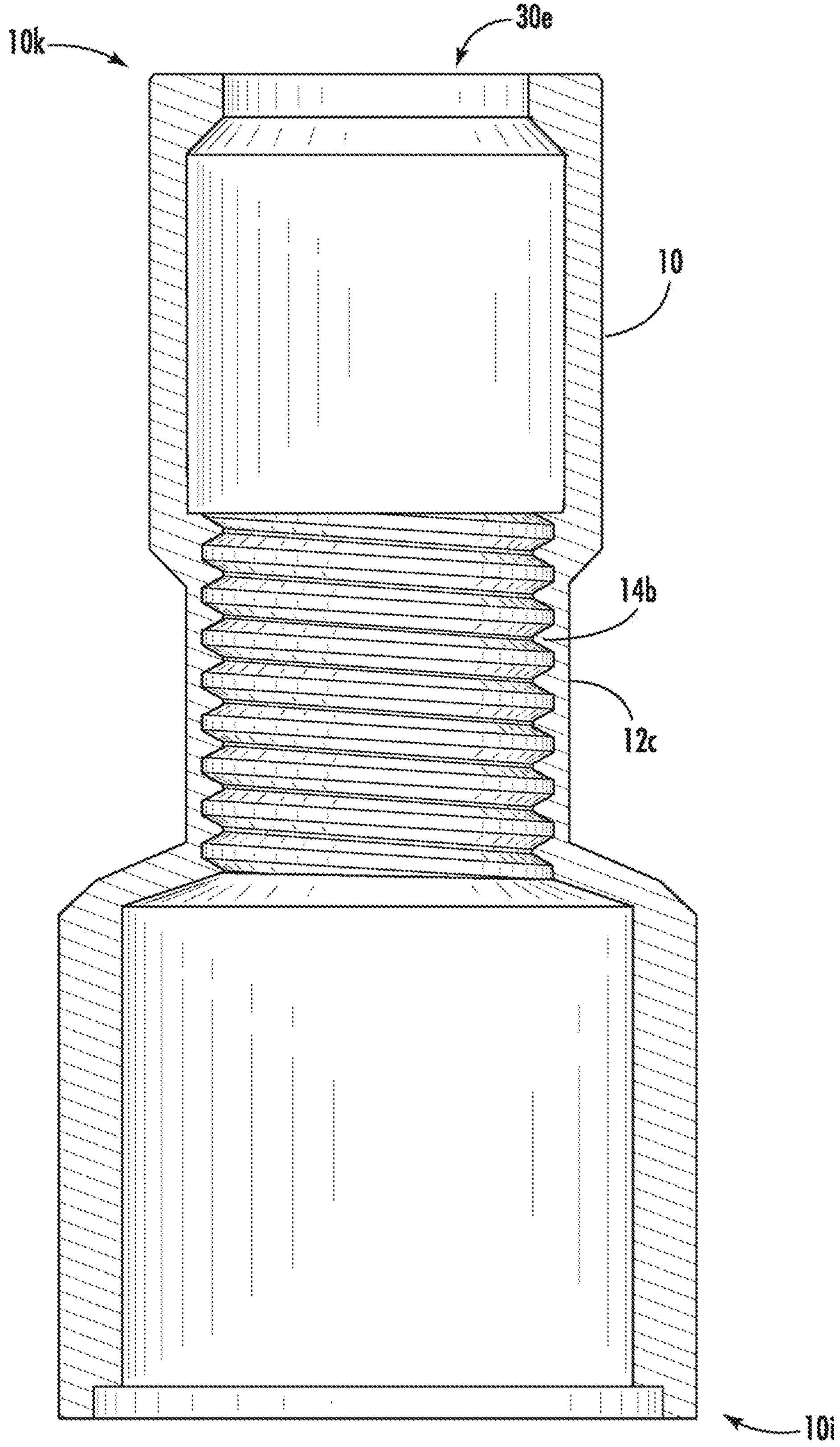
FIG. 2 is a side elevation, cross sectional view of the case body taken along lines A-A in FIG. 1B.
Figure 3:
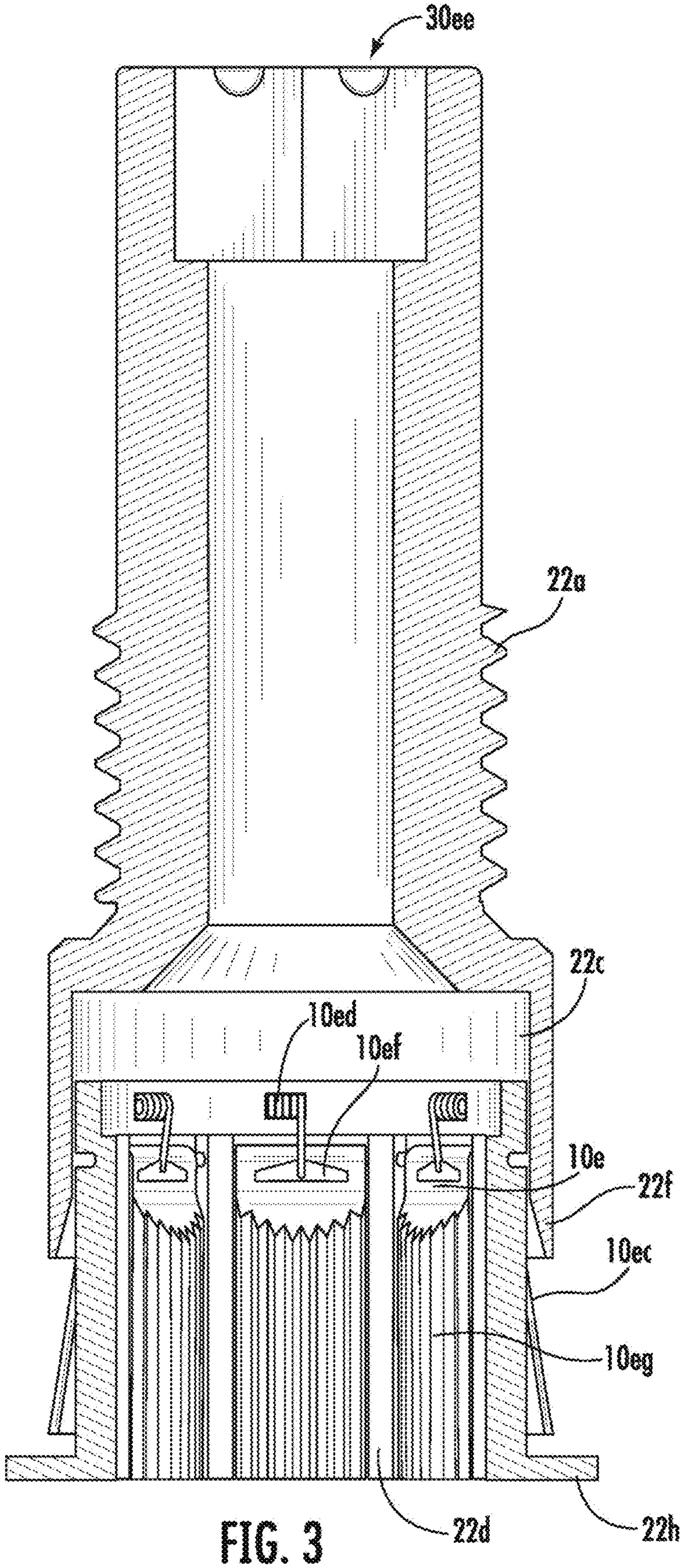
FIG. 3 is a side elevation, cross sectional view of the case insert in FIG. 1B, taken along lines B-B in FIG. 1B.
Figure 4A:
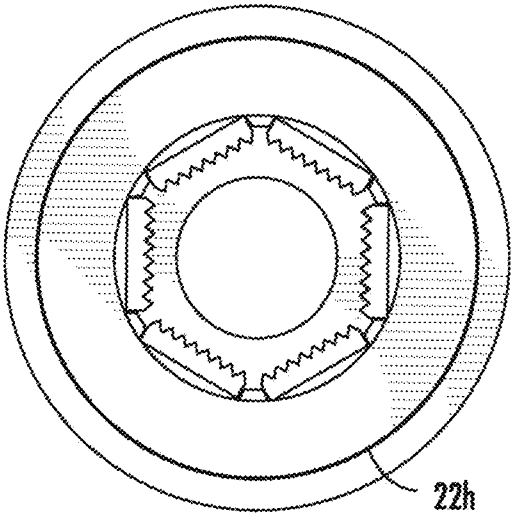
FIG. 4A is bottom view of the self-adjusting deep well socket, shown where the plurality of fingers are resting inside the finger channel with the case insert rotated upwards out of the finger channel.
Figure 4C:
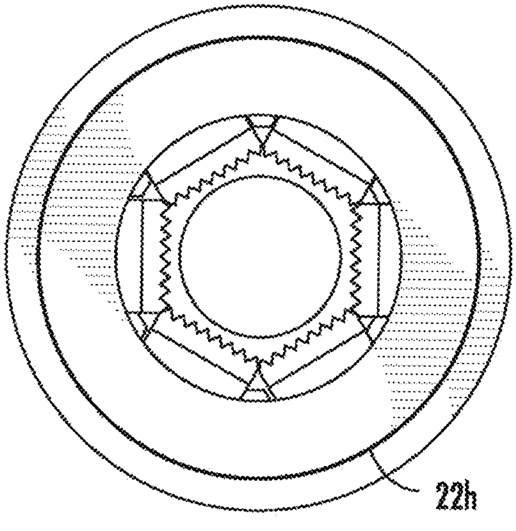
FIG. 4C is a bottom view of the self-adjusting deep well socket, shown with the plurality of fingers positioned into the deep well chamber by way of the case insert being rotated downwards and forcing the plurality of fingers out of the finger channel and into the deep well chamber.
Figure 4B:
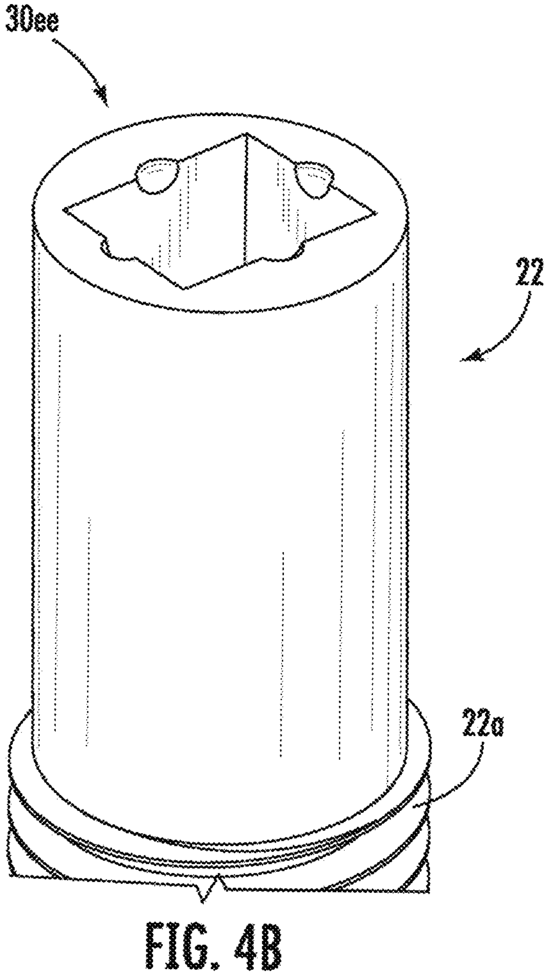
FIG. 4B is a detail perspective view of the case insert, showing the tool receiver square.

Looking at FIGS. 1A-B and FIG. 2, the case body 10 is a tubular housing with a top opening 30*e* at a wrench end 10*k* and an opposed bottom opening or fastener end 10*i*, with a hollow cavity spanning between the ends 30*e* 10*i*, the hollow cavity sized and shaped to receive the case insert 22. Mating threads 14*b* are formed long an inside wall of the case body 10 mateable with complementary mating threads 22*a* formed on a portion of an exterior wall of the case insert 22; the case insert 22 and case body 10 thus have a rotational, coaxial relationship with the case insert 22 rotating up and down along the mated threads inside the case body 10. The case body 10 is further formed with a tool grip 12*c*, shown in FIG. 10A as a constricted area with an approximately hexagonal shape formed centrally into the case body and having a plurality of flat sides adapted to be gripped by the prior art crescent wrench 300*b*. It should be noted that in this disclosure, references to the prior art crescent wrench 300*b* are meant to include other prior art tools such as pliers adapted to grasp and turn fasteners. In the Figures, the external case body 10 shape is roughly hourglass or pear-shaped, with the tool grip 12*c* being a narrowest diameter of the case body 10, however the inventor notes that the shape of the tool grip 12*c* can in fact be an entirety of the exterior case body shape, or otherwise be simplified so as to have at least two parallel, opposed flat sides, and thus the exterior shape of the case body shown in the Figures is not meant to limit the shape of the case body to what is shown, or limit the tool grip to hexagonal or roughly tubular shapes but rather to show some examples and suggestions of useful shapes allowing use of the prior art crescent wrench 300*b* with the socket 100, and that are additionally decorative and pleasing to the eye. The inventor expects that relatively smaller sockets will have an exterior shape approximating a hexagonal tube, and relatively larger sockets will be more hourglass or pear-shaped to provide additional room to accommodate relatively larger sized fasteners and shanks or threads, particularly those used for specialty applications such as for industrial cranes, construction equipment and the like, where large bolts with diameters of 12 inches or more will need respectively larger sockets.

The case insert 22 is a tubular structure with a hollow cavity or deep well chamber 10*c* spanning a top and bottom end of the case insert 22. A wrench insertion hole or tool receiver 30*ee* is formed into the top end and is sized and shaped to receive a drive square 300*a* of the prior art socket wrench 300. The tool receiver 30*ee* is sized to accommodate standard drive square sizes such as one quarter inch and up and can be sized to accommodate non-standard sizes or international sizes either by sizing up the tool receiver 30*ee* as needed or alternatively with appropriately-sized adaptors. When the case insert 22 is positioned inside the case body 10, as in FIG. 10A, the tool receiver 30*ee* is positioned at the wrench end 10*k* of the case body 10. At the bottom end, a mouth of the deep well chamber 10*c* is wider in diameter as compared to the tool receiver 30*ee*, and sized and shaped to house the finger support 22*i*. The case insert 22, with its deep well chamber 10*c*, and the case body 10, with its hollow cavity, thus have a coaxial relationship, with the case insert 22 moving upwards or downwards inside the case body by rotating along the mated threads 14*b* 22*a*.

The inventor notes that the case insert 22 is in rotatable relationship inside the case body 10 but is otherwise a single assembly and the case insert 22 is fully inserted into the case body 10, with no externally protruding parts, or at a minimum, the plurality of fingers are at all times housed inside the case body 10. The case insert 22 shown in the Figures is not removable from the case body 10, although in another embodiment, the inventor believes two separable pieces could be used, but with the danger that the separable embodiment increases risk of damage to the case insert 22, or loss of the separable pieces. Note that since the invention discloses a removing socket (for loosening the fastener) and a replacement socket (for replacing or otherwise tightening the fastener), separable pieces are prone to confusion and would require marking to avoid accidentally damaging the mating threads by trying to rotatably mate the case insert 22 into a wrong case body 10. Having a non-removable case insert 22 also has the advantage of keeping moving parts clean and free of debris that invariably builds up in a typical toolbox or tool bag and eliminates fumbling around for separate parts when actively working.

FIGS. 5B-E show a pair of sockets for removing and replacing the fastener 400 on the threaded fastener receiver 400*a* shown in FIG. 1A. For easier visualization of the movement of the fingers 10*e*, the fastener 400 and threaded fastener receiver 400*a* are not shown in FIGS. 5B-E.

Figure 5A:
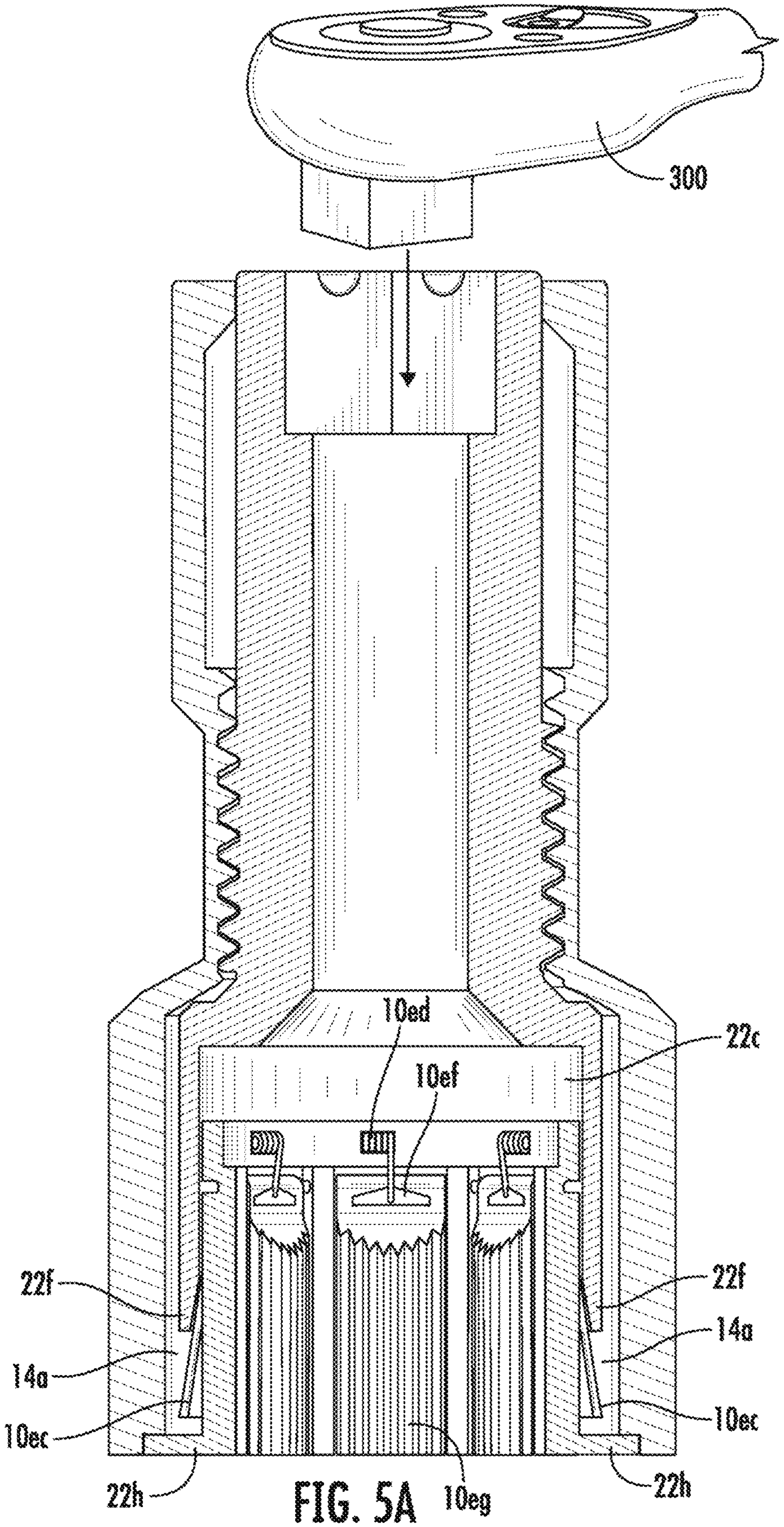
FIG. 5A is a cross sectional view of the self-adjusting deep well socket, taken along lines C-C in FIG. 1A, shown with the prior art socket wrench immediately prior to insertion into the socket.
Figure 5B:
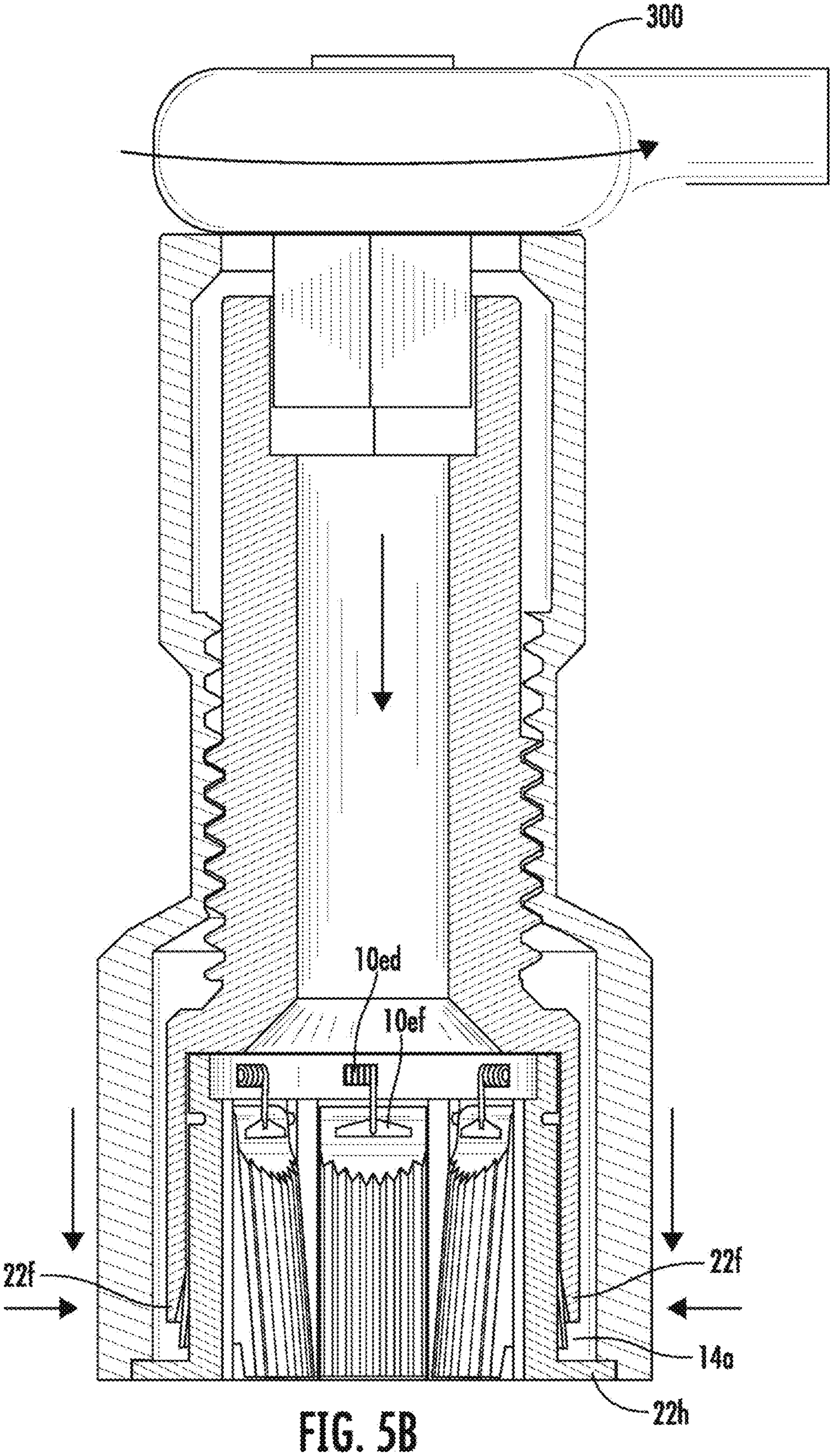
FIGS. 5B-C are cross sectional views of the self-adjusting deep well socket, taken along lines C-C in FIG. 1A, showing a first socket where in FIG. 5B, the prior art socket wrench inserted and turned counterclockwise drives the tip of the case insert downwards into the finger channel so as to push the plurality of fingers further into the deep well chamber, and in FIG. 5C, turning the prior art socket wrench clockwise, with the prior art crescent wrench positioned on to the case body simultaneously turned counterclockwise or held in place to prevent the case body from rotating, the tip of the case insert moves upwards and the plurality of fingers to move back into the finger channel, unlocking the fastener from the socket.
Figure 5C:
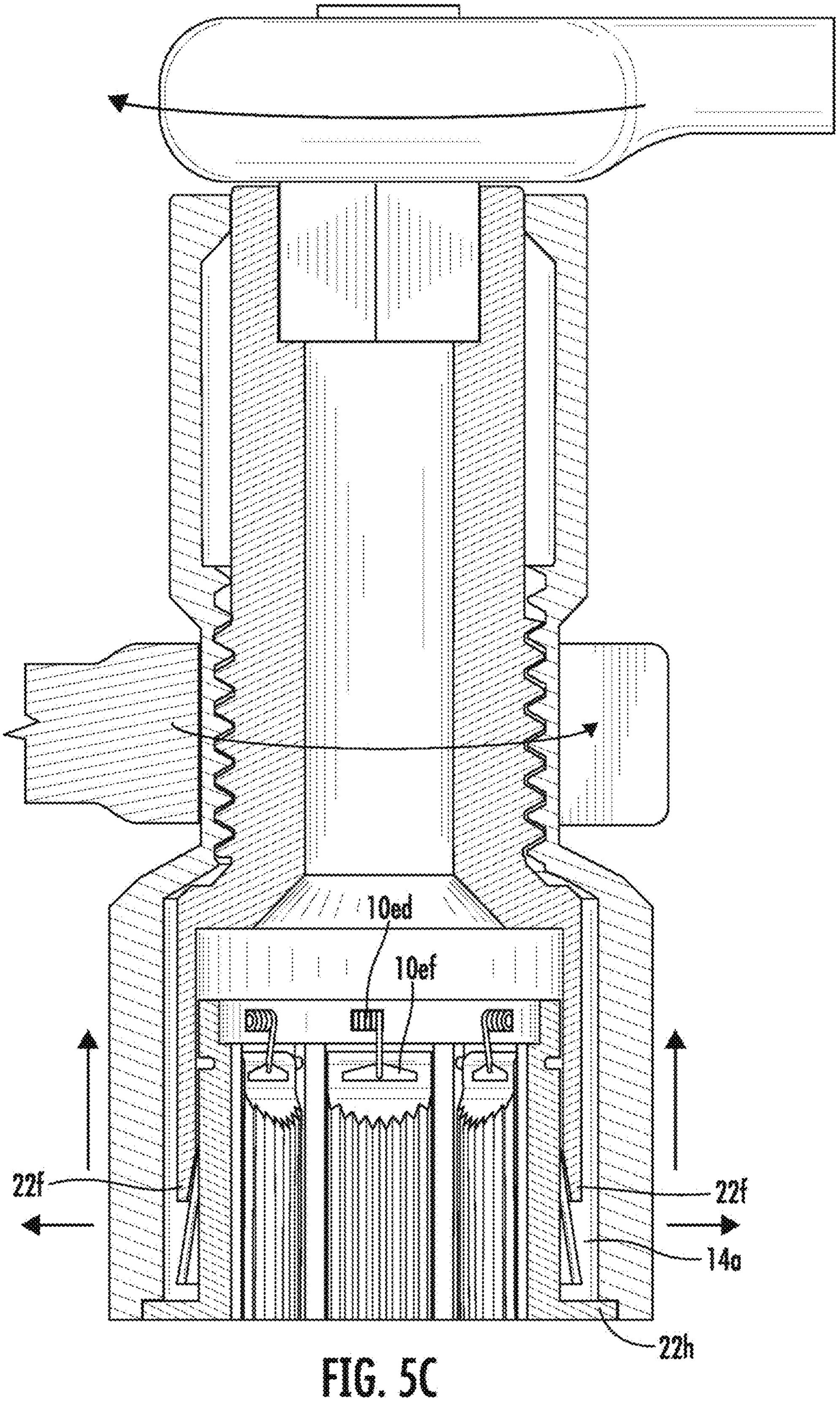

For the representative embodiment shown in the Figures, a "lefty loosey" socket in FIGS. 5B-C is shown with the drive square 300*a* inserted into the tool receiver 30*ee* and turned counterclockwise, or "lefty loosey" when looking down onto a top of the socket wrench, and turns the case insert 22 within the case body 10 counterclockwise, moving a tip of the case insert 22*f* downwards towards the fastener end 10*i* of the case body 10, and when positioned over a fastener 400 threaded onto the threaded fastener receiver 400*a* (shown in FIG. 1A), the fingers 10*e* move towards the fastener 400 thereby gripping it. Further turning of the insert 22 in a same direction frictionally causes the fastener 400 to unthread from the threaded fastener receiver 400*a* and thus be removed. The removed fastener 400 and socket are now locked together. The crescent wrench 300*b* is optionally used to grip the tool grip 12*c* or turn the body 10 via the tool grip 12*c* in an opposite direction of the socket wrench 300 if extra power is needed to remove the stuck fastener 400. To release the newly removed fastener 400, FIG. 5C shows the socket wrench 300 turning in a clockwise direction, causing the insert 22 and the insert tip 22*f* to move upwards, releasing the fingers 10*e* from the fastener 400 and allowing the fingers 10*e* to return to the finger bay 14*a*. The fastener 400 is now loose from the socket and set aside to be replaced later, or otherwise discarded and a new undamaged fastener can be threaded onto the threaded fastener receiver 400*a*.

Figure 5D:
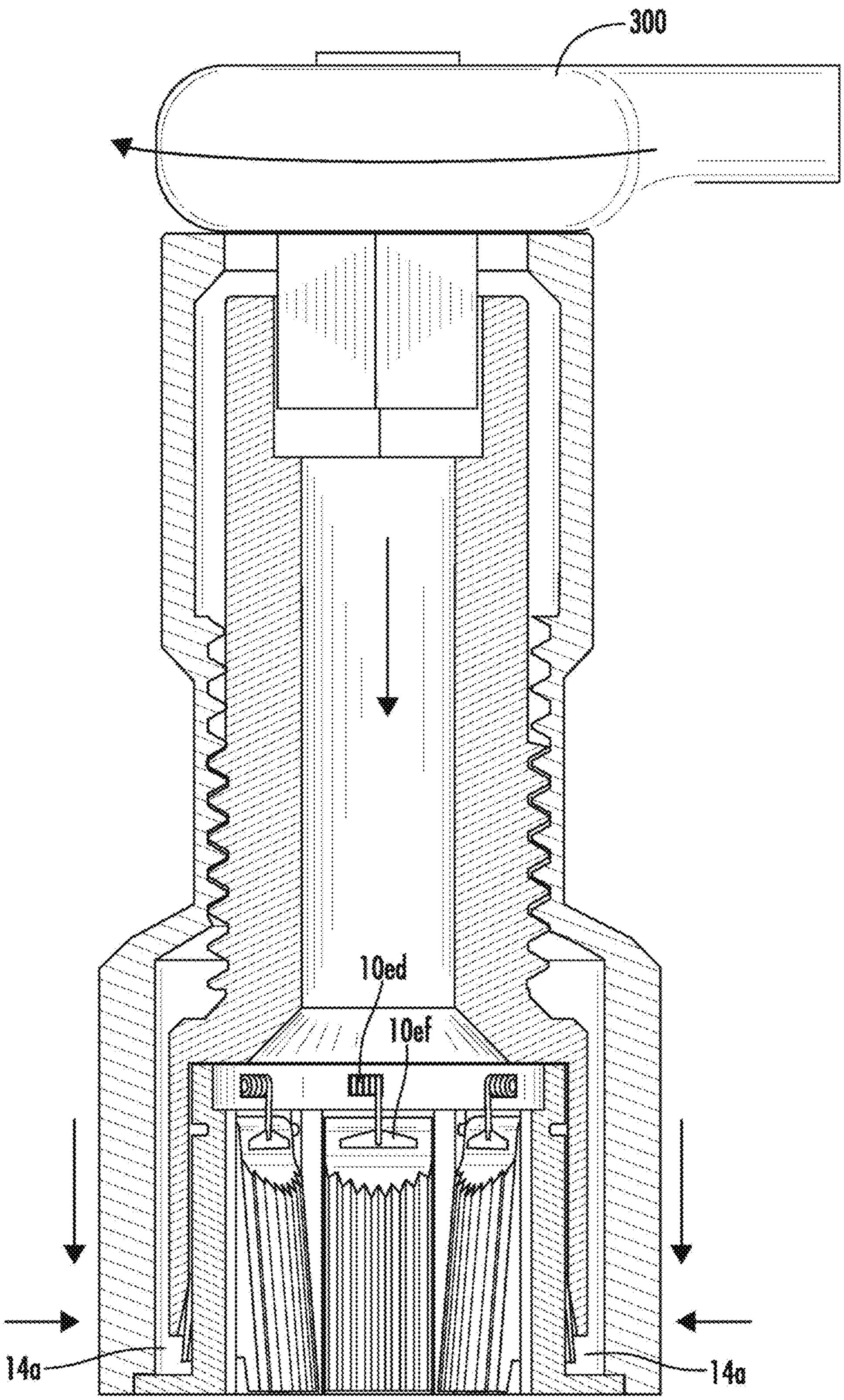
FIGS. 5D-E are cross sectional view of the self-adjusting deep well socket, taken again along lines C-C in FIG. 1A, showing a second socket where the threads are reversed from the first socket shown in FIGS. 5B-C, and where in FIG. 5D, turning the prior art wrench clockwise drives the tip of the case insert downwards to push the plurality of fingers into the deep well chamber, and in FIG. 5E, turning the prior art socket wrench counterclockwise and a prior art crescent wrench clockwise or held stationary on the case body, the tip of the case insert moves upwards, allowing the plurality of fingers to move back into the finger channel.
Figure 5E:
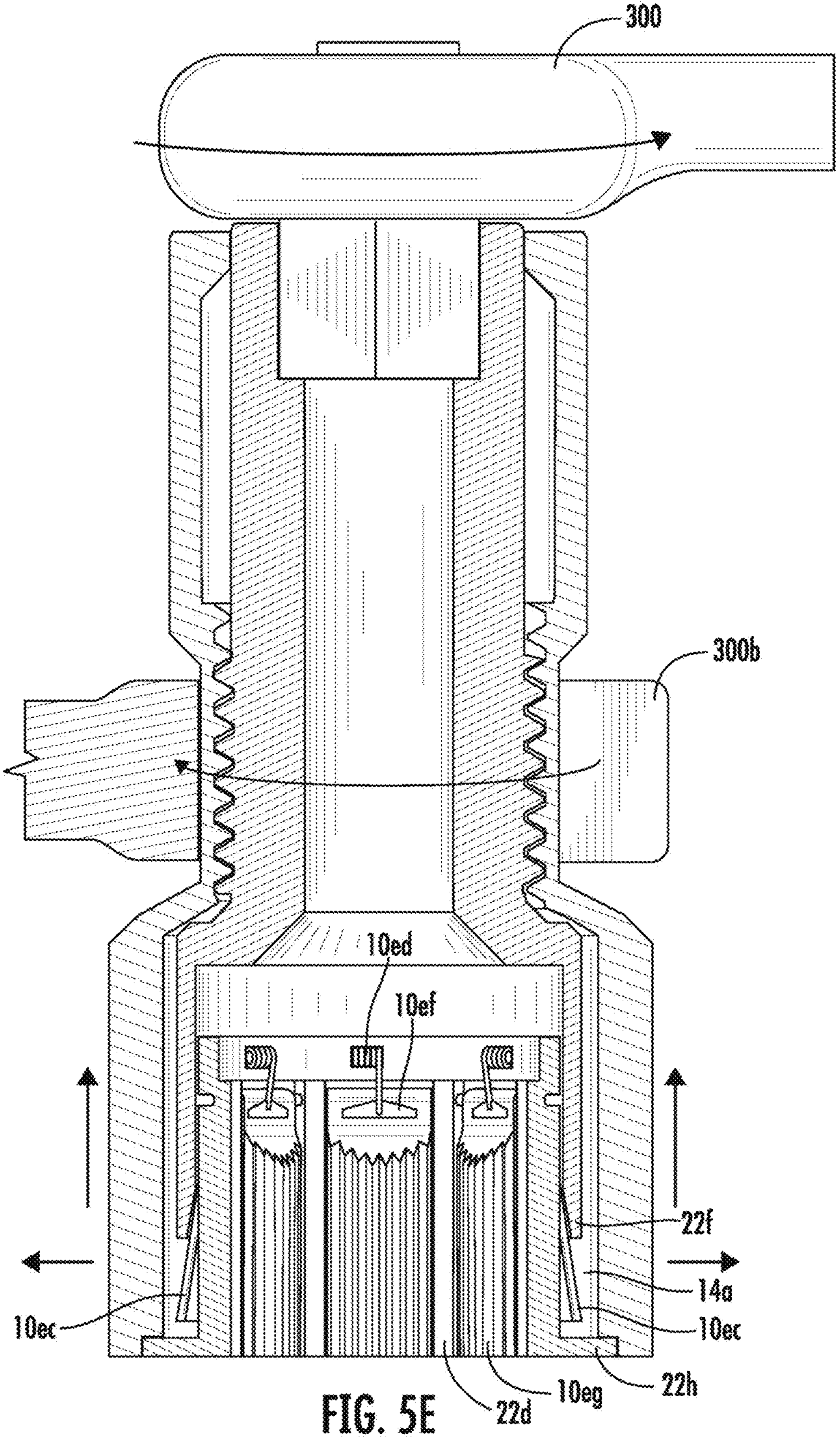
Figure 6:
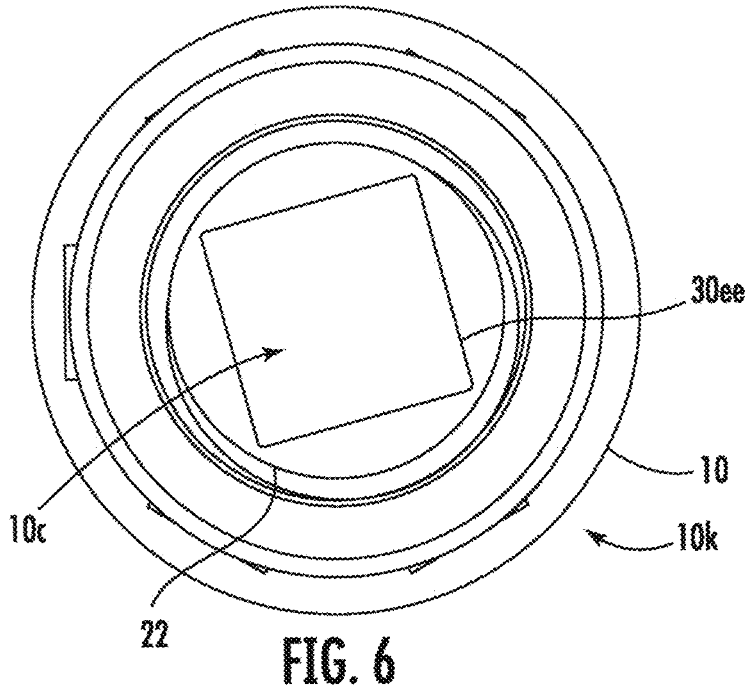
FIG. 6 is a top view of the self-adjusting deep well socket in FIG. 1A.

FIGS. 5D-E show a "righty tighty" socket adapted to replace the fastener 400 onto the threaded fastener receiver 400*a*. To use, the fastener 400 is hand threaded onto the threaded fastener receiver 400*a* (shown in FIG. 1A). The replacement socket shown in FIG. 5D is positioned over the fastener 400, the socket wrench inserted and then turned clockwise, causing the insert 22 to move downwards and pushing the fingers 10*e* against the fastener 400. Further turning of the socket wrench causes the fingers 10*e* to lock tight against the fastener 400, which then turns along with the socket until the fastener 400 is tightened. In FIG. 5E, the socket wrench is turned counterclockwise to raise the insert 22 and thus release the fingers 10*e* from the fastener 400. The socket is then removed from the fastener 400 and threaded fastener receiver 400*a*.

It should be noted that as the case insert 22 in the Figures has a reverse thread that mates with the threads of the case body 10, and can in fact rotate clockwise or counterclockwise along the mated threads Hence, FIGS. 5B-E describe a pair of left and right sockets 100 and the inventor notes that in certain applications, the ability to reverse the interior mating relative thread direction may be used to create two sets of sockets where appropriate: a first set for removing the fastener and a second set for replacing the fastener, and a relative thread direction of the case insert and the case body being the chief difference between each set. It should be noted that the Figures show "lefty loosey" to remove a fastener, and "righty tighty" to affix the fastener, but the pair of reverse thread sockets can easily be configured in an opposite configuration without loss of function. Note that the case body 10 itself does not change position, but rather, the case insert 22 travels up and down inside the case body 10 by rotating upwards or downwards along the mating threads.

The finger support 22*i* is an annular array of fingers 10*e* supported by an upper ring 22*c* attached to an annular plate 22*h* by a series of parallel, spaced apart vertical struts or arms 22*d*, every pair of adjacent arms defining a finger bay 22*j*. Each arm 22*d* is formed with a hole 22*ee* on opposed sides of the arm 22*d*, either configured as a single through-hole or a pair of channels sized and shaped to receive a pin 22*e*. The finger bay 22*j* receives the finger 10*e*, with each finger 10*e* pivotably affixed to the pair of adjacent arms of its finger bay 22*j* by a pin 22*e* inserted both into a finger hole 22*ek* of the finger 10*e* and to the holes 22*ee* of the adjacent arms 22*d*. The Figures show an illustrative pin 22*e*, hole 22*ee* and finger hole 22*ek* relationship that allows the fingers 10*e* to have a pivotable relationship with the adjacent arms 22*d* of the finger bay 22*j*, and modifications to the pin-hole structures shown in the Figures, so long as the finger 10*e* can pivot in its respective finger bay 22*j* are acceptable. Each finger 10*e* is further affixed to the upper ring 22*c* by a spring 10*ed*, shown in the Figures as a torsion spring, with one end of the spring 10*ed* attached to the upper ring 22*c* and the other end attached to a spring plate 10*ef*. The spring plate 10*ef* presses against the finger 10*e* to maintain the finger's position and ensure the deep well chamber 10*c* is unobstructed. Each finger 10*e* is approximately teardrop shaped, with a gripping side 10*eg* facing inwards towards the deep well chamber 10*c*, and a channel side 10*ec* facing the finger channel 14*a*. The fingers 10*e* are elongated at a lowermost end such that a portion of the finger gripping side 10*eg* is approximately flush with a lowermost end of the finger support 22*i* at the fastener end 10*i* of the case body 10. The gripping side 10*eg* may be further coated with material such as silicone or have a rough surface to enhance its ability to grip the fastener 400. The finger support 22*i* is positioned inside the case insert 22 at the bottom opening. As previously mentioned, each finger 10*e* can pivot about the pin 22*e* and thus enter or move out of the finger channel 14*a* and deep well chamber 10*c*. In some embodiments, the finger support 22*i* welded to the case insert 22, and in others, the finger support 22*i* is optionally formed with a push-in retaining ring to allow the finger support to be pressure fitted into the case insert 22. The spring 10*ed* and spring plate 10*ef* are part of an optional embodiment and the ability of the fingers 10*e* to pivot freely is one acceptable embodiment of the invention described herein.

The teardrop shape of the finger 10*e* has the flattened portion extending towards the uppermost end of the finger 10*e* and allows the tip 22*f* of the case insert 22 to easily slide along the finger 10*e*, displacing the finger's resting position inside the finger channel 14*a* and effectively pushing the gripping side 10*eg* of the finger further into the deep well chamber 10*c*. The inventor notes that the nature of the invention is such that within a same socket, the fingers 10*e* may all be of a same depth, varying depths, or other combinations of depths, with the depth measured from the gripping side 10*eg* to the channel side 10*ec* within a same case body 10, as needed. The inventor also notes that at all times and internal distances travelled by the case insert 22, the plurality of fingers is always contained within the case body 10 and are not exposed.

Since each finger 10*e* can move independently of the other fingers, a deformed or otherwise irregularly shaped fastener 400 can still be gripped tightly on all sides by the fingers 10*e*, as any areas where the fastener shape has been eroded, the fingers 10*e* will simply have more room to extend into the deep well chamber 10*c*. Hence, a lack of a regular fastener shape, such as a hexagon, is no longer a challenge to remove or even replace because the plurality of fingers 10*e* naturally adjust to the shape of the fastener 400. The inventor stresses this is a key feature of his invention, as currently, there are no self-adjusting sockets that can accommodate irregularly shaped fasteners. On the contrary, the prior art sockets are shape specific (hexagonal, square, etc.) with flat or otherwise planar fastener-contacting surfaces and rely on the fasteners themselves having precise shapes including corners and flat surfaces in specific arrangements, such as squares, hexagons, etc. as those corners and flat surfaces are necessary to allow the prior art socket to grip the fastener. A socket described by Pirseyedi in U.S. Pat. No. 7,707,916, for instance describes the fastener gripping surfaces as having a flat side facing the fastener, despite being described as an adjusting socket. This socket adjusts for fastener size but cannot adjust for fastener damage where there are irregular exterior gripping surfaces. The inventor's socket 100, in bold contrast, can just as easily secure irregularly or curvy shaped fasteners as precisely as undamaged hexagonal shaped fasteners because of the adjustable nature of the fingers 10*e*, and the inventor's reference to his invention as a "self-adjusting socket" refers not only to the socket's ability to accommodate fasteners of different regular sizes, but also and more importantly to accommodate fasteners with irregular shapes and surface damage, which nothing in the prior art currently addresses. The state of the prior art is to use a saw to cut off the damaged fastener, or to drill out the damaged fastener, rather than attempt to remove the fastener by turning it. The inventor's focus with his invention is to particularly address the problem of damaged fastener removal and to create a new socket that allows use of prior art wrenches to remove and if desired, to reapply, the damaged fastener.

The socket 100 described herein is useful for use with prior art ratcheting and non-ratcheting socket wrenches 300 and is designed as a substitute for conventional prior art sockets. The inventor believes a set of sockets 100 in standard sizes are most useful, with each socket size based on a prior art standard socket size but with an adjustable fastener range determined by a predetermined depth of the fingers 10*e* measured from the gripping side 10*eg* to the channel side 10*ec* to accommodate a variety of damaged or otherwise irregularly shaped fasteners. In the example shown in the Figures, for a half-inch diameter fastener, the half inch socket is designed to accommodate fasteners from ¼ inch to ½ inch wide, and ideally at least two socket sizes or two or more metric socket sizes. A fastener width or fastener size or standard head size for the fastener is measured from across a largest width of the fastener. Standard imperial and metric socket head sizes thus are sized according to standard head sizes for the fastener. For a drive socket having a ¼ inch size, imperial socket head sizes are from 5⁄32 inches to inch, and with a typical socket head count of 10 to cover the size range of fasteners. For a drive socket having a ⅜ inch size, the imperial socket head sizes range from ¼ inch to ⅞ inches with 12 sockets required to cover this range of fastener sizes. Socket sets are thus large and comprised of many socket heads, adding to production costs, and for the end user, requiring a large case or other organizer for the sockets. Hence, the invention herein described results in fewer sockets can be included within a socket set and still cover a full range of fastener sizes, saving on storage space, and material costs. Universal sockets covering more than two standard fastener sizes are achievable by again modifying the predetermined finger depth as well as a diameter of the deep well chamber and a diameter of the finger channel 14*a* and by sizing the case insert, case body and a total thread length of the case body and case insert accordingly to maximize finger travel from the finger channel 14*a* to the deep well chamber 10*c*. The inventor also notes that his socket is a deep-well socket, and different from other standard sockets in a typical prior art socket set as it can be positioned over a relatively long bolt of 2 or more inches that is currently not addressed by the prior art. Prior art sockets are designed to fit over an entire outside surface of the fastener, and a typical socket currently fits an approximately 1 inch bolt. When a fastener such as a nut is threaded onto a long bolt, removing the nut can be difficult because the long bolt cannot be accommodated by the prior art socket.

The inventor recommends making his socket invention out of metals, alloys and structural plastic for some or all components. Since considerable torque is needed to fasten or unfasten a damaged bolt or nut, especially a corroded fastener, the inventor suggests using all or mostly metal components for the socket 100 to ensure a stronger and more durable product. The inventor notes the gripping side of the fingers may also include a coating, such as silicone and/or rubber, pads, or be embossed with a texturized design to enhance the grip of the fingers 10*e*. The inventor also notes that materials used for the various components will also vary depending on whether the socket 100 is for home DIY use or commercial use.

The inventor notes his socket 100 as described in the Figures and above is just one example of how a self-adjusting deep well socket can be secured to and then removed from a damaged or irregularly shaped fastener. He notes that even simpler sockets can be created with a single hexagonal cylindrical socket with the fingers as described above, but with a removable case body that slips over the socket that can be expanded or compressed as needed, to push the fingers 10*e* around the fastener in the deep well chamber 10*c*. The inventor also notes that while he believes starting with a hexagonal cylindrical deep well socket shape is ideal, given that the fingers adjust to the shape of the fastener positioned inside the socket when the socket is tightened in place, the socket could also be a simple cylinder with smooth exterior or interior walls with the plurality of fingers and this would work with any shaped fastener, so long as the fingers are wide enough to extend as far as necessary to engage all sides of the fastener.

The inventor believes his socket 100 elegantly solves the vexing problem present in the prior art, namely, the lack of an adjustable-sized socket, and which uses prior art tools for added convenience. The prior art currently only provides sockets of specific dimensions ill designed to accommodate fasteners of irregular shapes and it is notable that with both imperial and metric systems being used around the world, most people end up buying two types of socket sets to cover fasteners from both systems. The socket 100 described herein reduces the overall number of sockets needed and eliminates the differences between metric and imperial systems. Hence, it is to be understood that the above-described arrangements are only illustrative of the application of the principles of the present invention, and numerous modifications and alternative arrangements, such as the ones just described, may be devised by those skilled in the art without departing from the scope of the present invention. Accordingly, any components of the present invention indicated in the drawings or herein are given as an example of possible components and are not meant as a limitation. The inventor believes that having a socket set kit having a removing socket set of three sizes and a replacing socket set of three sizes would be able to replace the current socket sets having a plurality of socket sizes at a lower cost and with fewer overall parts without loss of functionality.

What is claimed is:

1. A self-adjusting deep well socket comprising:

a case insert having a tool receiver end sized and shaped to receive a drive square of a socket wrench, an opposed fastener receiver end sized and shaped to receive a threaded fastener having a height measurement and an outside diameter measurement, and a deep well chamber extending from the tool receiver end to the opposed fastener receiving end;

a case body having a top end, a bottom end, and an interior wall defining a cavity extending from the top end to the bottom end, the cavity sized and shaped to receive the case insert such that the tool receiver end is positioned at the top end of the case body and in which the case body and the case insert have a coaxial relationship; and a plurality of fingers in an annular array inside the case insert at the fastener receiving end;

wherein the case insert and an interior wall of the case body are both formed with complementary mating threads;

wherein each finger has a pivoting end around which the finger pivots about an attachment point at an upper end of the annular array;

wherein the plurality of fingers move into the deep well chamber when the case insert is rotated in a first direction towards the fastener receiving end;

wherein the cavity is further sized and shaped to accommodate a travel distance of the case insert rotating within the case body;

wherein the plurality of fingers of the case insert are at all times housed within the case body regardless of the travel distance; and wherein the deep well chamber is sized to internally accommodate the height measurement of the fastener, where the height measurement is at least 2 inches.

2. The adjustable size socket in claim 1, wherein each finger of the plurality of fingers has at least one of a same or varying size predetermined depth as compared to each other finger.

3. The adjustable-size socket in claim 1, wherein the plurality of fingers is supported by an annular support where each finger is independently affixed to the annular support and moves independently of the other fingers in the annular support.

4. The adjustable-size socket in claim 3, further comprising a torsion spring having a first end and a second end, the second end contacting the finger at the pivoting end of the finger.

5. The adjustable-size socket in claim 3, wherein the annular support is further comprised of a series of finger bays, each finger bay sized and shaped to receive a finger of the plurality of fingers.

6. The self-adjusting socket in claim 5, further comprising a finger channel positioned between the interior wall of the case body and the annular support.

7. The self-adjusting socket in claim 1, wherein each finger of the plurality of fingers is further comprised of a gripping side facing the deep well chamber.

8. The self-adjusting socket in claim 1, wherein the open channel has a predetermined length measuring less than a perimeter measurement of the case insert.

9. The self-adjusting socket in claim 1, wherein the case insert pushes the plurality of fingers into the deep well chamber when the case insert is rotated towards the fastener receiver end of the case body.

10. The self-adjusting socket in claim 9, wherein at least one of the fingers of the plurality of fingers is positioned further into the deep well chamber relative to another finger of the plurality of fingers.

11. The self-adjusting socket in claim 1, wherein at least one the case body and the case insert is made of metal.

12. The self-adjusting socket in claim 1, wherein the deep well chamber, the plurality of fingers, and the finger channel are sized such that a single self-adjusting socket accommodates a plurality of fasteners whose diameter sizes include two standard socket sizes.

13. The self-adjusting socket in claim 1, wherein the self-adjusting socket is a universal socket and the deep well chamber, the plurality of fingers, and the finger channel are sized to accommodate a plurality of fasteners whose diameter sizes include three or more standard socket sizes.

14. The self-adjusting socket in claim 1, wherein the first direction is counterclockwise.

15. The self-adjusting socket in claim 1, wherein the first direction is counterclockwise.

16. The self-adjusting socket in claim 1, wherein the case insert is rotatably removable from the case body.

17. A socket set, comprising:

a first socket having a case body with a threaded inner chamber and a threaded insert where the threaded insert rotatably couples to the threaded inner chamber in a first direction;

a second socket having a second case body with a second threaded inner chamber and a second threaded insert where the second threaded insert rotatably couples to the second threaded inner chamber in a second direction opposite the first direction;

whereby positioning the first socket over a fastener and turning it in a first direction loosens the fastener from its threaded fastener receiver, and positioning the second socket over the fastener on its threaded fastener receiver tightens the threaded fastener, wherein each of the first socket and the second socket are further comprised of a deep well chamber and plurality of fingers in an annular array;

wherein each finger has a pivoting end around which the finger pivots about an attachment point at an upper end of the annular array;

wherein the plurality of fingers move into the deep well chamber when the case insert is rotated in a first direction towards the fastener receiving end;

wherein the cavity is further sized and shaped to accommodate a travel distance of the case insert rotating within the case body;

wherein the plurality of fingers of the case insert are at all times housed within the case body regardless of the travel distance; and wherein the deep well chamber is sized to internally accommodate the height measurement of the fastener, where the height measurement is at least 2 inches.

18. The kit in claim 17, wherein the fastener is further comprised of a standard head size and wherein the first socket is sized to fit at least two standard head sizes.

19. The kit in claim 18, further comprising three first sockets, and wherein the three first sockets are sized and shaped to fit the standard head size spanning at least nine standard head sizes, with a smallest head size of 5/32 inches and a largest head size of 1.5 inches.

* * * * *